United States Patent [19]

Franz et al.

[11] Patent Number: 4,997,684

[45] Date of Patent: Mar. 5, 1991

[54] METHOD OF USING PERFLUOROALKYLSILANES TO LOWER THE SURFACE ENERGY OF GLASS

[75] Inventors: Helmut Franz, Indiana Township, Indiana County; George B. Goodwin, Mars, both of Pa.

[73] Assignee: PPG Industries, Inc., Pittsburgh, Pa.

[21] Appl. No.: 554,486

[22] Filed: Jul. 19, 1990

[51] Int. Cl.$^5$ .............................................. B05D 3/02
[52] U.S. Cl. .................................... 427/384; 427/165; 427/387; 427/389.7; 427/397.7
[58] Field of Search ..................... 427/384, 397.7, 387, 427/389.7, 165

[56] References Cited

U.S. PATENT DOCUMENTS 4,529,657 6/1985 Franz et al. .......................... 428/410

*Primary Examiner*—James Seidleck
*Assistant Examiner*—Don Sumihiro
*Attorney, Agent, or Firm*—Donna L. Seidel

[57] ABSTRACT

A method is disclosed wherein a glass substrate is provided with a durable non-wetting surface by treatment with a perfluoroalkyl alkyl silane and a fluorinated olefin telomer.

10 Claims, No Drawings

METHOD OF USING PERFLUOROALKYLSILANES TO LOWER THE SURFACE ENERGY OF GLASS

This is a division of application Ser. No. 503,587, filed Apr. 3, 1990.

BACKGROUND

The present invention relates generally to the art of glass surface treatment and, more particularly, to the art of producing a nonreactive, non-wetting glass surface.

THE PRIOR ART

U.S. Pat. No. 4,263,371 to Franz teaches a method for reducing the surface energy of a glass article by chemisorption of an organotin compound at a temperature insufficient to thermally decompose the compound. Such compounds as methyltin chloride are shown to increase the contact angle of a drop of water on the surface from 10° for untreated glass to 45 to 90° for various compounds.

U.S. pat. No. 4,276,350 to Franz discloses a method for reducing the reactivity of a glass surface by blocking reactive sites such as silanol groups a the glass surface with a molecular layer of fluorocarbon. The method involves absorbing multivalent cations oat the glass surface to provide anchoring sites for the chemisorption of otherwise nonreactive fluorocarbons.

U.S. Pat. No. 4,301,197 to Franz et al. discloses the formation of highly efficient release surfaces on glass substrates by treatment of the glass with poly alkyl hydrogen siloxane. The treated glass surface effectively releases such materials as polycarbonates, acrylics, and polyurethanes contacted in press polishing or laminating processes.

U.S. Pat. No. 4,529,657 to Franz discloses reducing the surface energy of glass by absorbing multivalent cations such as chromium onto a glass surface, then treating the surface with an aqueous solution of an alkali metal alkylate such as sodium stearate or oleate to bond the long chain paraffinic or olefinic acid anion to the glass surface by ionic bonding of the alkylate anion to the absorbed multivalent cation, thereby rendering the glass surface non-wettable and lubricated.

SUMMARY OF THE INVENTION

The present invention provides a substrate surface with high water repellancy and high lubricity. Durable water and direct repellancy of a glass surface are provided by chemically bonding a select combination of fluorinated compounds to the glass surface. High water repellance is provided by perfluoroalkylsilanes which form strong molecular bonds to the glass surface while high lubricity is provided by addition of fluorinated olefin telomers.

DESCRIPTION OF THE PREFERRED EMBODIMENT

A perfluoroalkyl alkyl silane is combined with a fluorinated olefin telomer to produce the compositions of the present invention. The silane/olefin composition is preferably employed as a solution, preferably in a fluorinated solvent. The solution of the present invention is applied to a glass surface by any conventional technique such as dipping. flowing, wiping and, preferably, spraying. The solvent is evaporated and the composition is preferably heat-cured to produce durable non-wetting, lubricating surface.

Preferred perfluoroalkyl alkyl silanes have the general formula $R_nR'SiX_{4-n}$, wherein R is a perfluoroalkyl radical, n is preferably 1, R' is an alkyl, preferably ethyl, vinyl or propyl, and X is preferably a radical such as alkyl, halogen, and/or alkoxy. Preferred perfluoroalkyl radicals range from $CF_3$ to $C_{30}F_{61}$, preferably $C_6$ to $C_{16}$, and most preferably $C_8$ to $C_{10}$. R' is preferably ethyl. Preferred radicals for X include chloro, iodo, methyl, methoxy, ethoxy and acetoxy radicals. Preferred perfluoroalkyl ethyl silanes in accordance with the present invention include perfluoroalkyl ethyl-trichlorosilane, perfluoroalkyl ethyl-trimethoxysilane, perfluoroalkyl ethyl-dichloro(methyl)silane and perfluoroalkyl ethyl-diethoxy(methyl)silane. These perfluoroalkyl ethyl silanes appear to react with bonding sites at the glass surface on a molecular basis. There does not appear to be polymerization or crosslinking. Strong surface bonding of the perfluoroalkyl ethyl silanes produces a glass surface which exhibits a high contact angle with a drop of water, indicating high water repellancy. The fluorinated olefin telomer, which does not on its own bond to the glass surface, but which is bonded in combination with the perfluoroalkyl silane, provides lubricity to promote dirt repellancy. The olefin structure provides for crosslinking to produce a durable surface. Preferred olefin telomers have the general formula $C_mF_{2m+1}CH=CH_2$ wherein m may range from 1 to 30. The more preferred olefin telomers are a mixture of compounds of the above formula wherein m ranges from 1 to 16, preferably 4 to 10.

Suitable solvents include isopropanol, ethanol, hexane, heptane, acetone, toluene and naphtha. Preferred solvents are fluorinated hydrocarbon solvents such as trichlorotrifluoroethane, and methylene chloride. Concentrations of about 0.005 to 5, preferably about 0.05 to 2, percent of each component are preferred.

The solvent is preferably evaporated simply by drying in air at ambient temperature. The composition is then cured by heating the treated surface. A cure cycle of about 200° F. for about 30 minutes is suitable. Higher temperatures and shorter heating times are more efficient. A cure cycle of 2 to 5 minutes at 400 to 500° F. is preferred. A most preferred cure cycle is 3 minutes at about 470°F.

The contact angles recited herein are measured by the sessile drop method using a modified captive bubble indicator manufactured by Lord Manufacturing, Inc., equipped with Gartner Scientific Goneometer optics. The surface to be measured is placed in a horizontal position, facing upward, in front of a point source light such as a slide projector lamp. A drop of water is placed on top of the surface in front of the light source so that the contours of the sessile drop can be viewed and the contact angle measured through a goneometer telescope equipped with circular protractor graduation.

The contact angle for a sessile drop of water on an untreated glass surface is typically about 10°. Surfaces treated according to the present invention having desirable surface properties typically have contact angles greater than 80°, preferably greater than 90°, and most preferably between 100° and 115°.

The present invention will be further understood from the descriptions of specific examples which follow.

EXAMPLE I

A solution is prepared comprising 5 grams of perfluoroalkyl ethyl trichlorosilane and 5 grams of fluorinated olefin telomer in 100 grams of Freon TF solvent, available from DuPont. One coat of the solution is applied to a surface of a clear glass substrate which is then heated to 200° F. for 30 minutes to cure the coating. The contact angle of the treated surface is 108°. To test the durability of the non-wetting surface, the glass substrate is immersed in boiling water. After 2 hours in the boiling water, the contact angle is 100°; after 6 hours, the contact angle is 91°, indicating that the non-wetting surface is durable.

EXAMPLE II

The above solution is applied to a surface of a tinted glass substrate, which is then heated for 3 minutes at 350° C. The contact angle of the treated surface is initially 102°. After 2 hours in boiling water, the contact angle is 90°; and after 4 hours, it is 89°, still an effective non-wetting surface.

The above examples are offered to illustrate the present invention. Various perfluoroalkyl silanes, fluorinated olefin telomers, solvents and concentrations may be applied by any conventional technique, and cured at suitable temperatures for adequate times to provide durable non-wetting surfaces to any of a variety of glass compositions, as well as other inorganic surfaces such as ceramics, enamels, and metal or metal oxide films. The treated glass of the present invention is especially suitable in automobile windshields, side and back windows, as well as in building windows.

I claim:

1. A method of producing a non-wetting surface on a glass substrate comprising the steps of:
   a. contacting a glass surface with a composition comprising a perfluorioalkyl alkyl silane and a fluorinated olefin telomer; and
   b. heating the glass surface contacted with said composition to produce a durable non-wetting surface.

2. A method according to claim 1, wherein said perfluoroalkyl alkyl silane is selected from compounds having the general formula $R_nR'SiX_{4-n}$ wherein R is a perfluoroalkyl radical, R' is an alkyl radical, n is less than 4, and X is a radical selected from the group consisting of alkyl, halogen, alkoxy and acetoxy radicals.

3. A method according to claim 2, wherein said perfluoroalkyl radical is selected from the group consisting of $CF_3$ to $C_{30}F_{61}$.

4. A method according to claim 3, wherein said perfluoroalkyl radical is selected form the group consisting of $C_6$ to $C_{16}$.

5. A method according to claim 4, wherein said perfluoroalkyl radical is selected from the group consisting of $C_8$ to $C_{10}$.

6. A method according to claim 2, wherein R' is selected from the group consisting of ethyl, vinyl and propyl.

7. A method according to claim 2, wherein X is selected from the group consisting of chloro, iodo, methyl, methoxy, ethoxy and acetoxy.

8. A method according to claim 7, wherein said perfluoroalkyl alkyl silane is selected from the group consisting of perfluoroalkyl ethyl-trichlorosilane, perfluoroalkyl ethyl-trimethoxysilane, perfluoroalkyl ethyyl-dichloro(methyl)silane and perfluoroalkyl ethyl-diethoxy(methyl)silane, wherein said fluorinated olefin telomer is selected for the group consisting of $C_mF_{2m+1}CH=CH_2$, wherein m is from 1 to 30.

9. A method according to claim 8, wherein m is from 1 to 16.

10. A method according to claim 9, wherein m is from 4 to 10.

* * * * *

UNITED STATES PATENT AND TRADEMARK OFFICE
CERTIFICATE OF CORRECTION

PATENT NO. : 4,997,684
DATED : March 5, 1991
INVENTOR(S) : Helmut Franz and George B. Goodwin It is certified that error appears in the above-identified patent and that said Letters Patent is hereby corrected as shown below:

Claim 1, column 4, line 2, "perfluorioalkyl" should read "perfluoroalkyl".

Claim 4, column 4, line 16, "form" should read "from".

Claim 8, column 4, line 30, after "perfluoroalkyl", "ethyyl-" should read "ethyl-".

Signed and Sealed this

Eighth Day of December, 1992

Attest:

DOUGLAS B. COMER

*Attesting Officer*  *Acting Commissioner of Patents and Trademarks*